(12) United States Patent
Agarwal et al.

(10) Patent No.: US 11,347,521 B2
(45) Date of Patent: May 31, 2022

(54) CLOUD RESTART FOR NON-CRITICAL PERFORMANCE VIRTUAL MACHINES

(71) Applicant: VMware, Inc., Palo Alto, CA (US)

(72) Inventors: Anant Agarwal, San Jose, CA (US); Rahul Chandrasekaran, Los Altos, CA (US); Aalap Desai, Newark, CA (US); Vikram Nair, Mountain View, CA (US); Zhelong Pan, Cupertino, CA (US)

(73) Assignee: VMware, Inc., Palo Alto, CA (US)

(*) Notice: Subject to any disclaimer, the term of this patent is extended or adjusted under 35 U.S.C. 154(b) by 185 days.

(21) Appl. No.: 16/744,896

(22) Filed: Jan. 16, 2020

(65) Prior Publication Data

US 2021/0224077 A1 Jul. 22, 2021

(51) Int. Cl.
*G06F 9/4401* (2018.01)
*G06F 9/455* (2018.01)
*G06F 11/34* (2006.01)

(52) U.S. Cl.
CPC ........ *G06F 9/4418* (2013.01); *G06F 9/45558* (2013.01); *G06F 11/3495* (2013.01); *G06F 2009/45575* (2013.01); *G06F 2009/45595* (2013.01)

(58) Field of Classification Search
CPC .............. G06F 9/4418; G06F 9/45558; G06F 11/3495; G06F 2009/45575; G06F 2009/45595
See application file for complete search history.

(56) References Cited

U.S. PATENT DOCUMENTS

| | | | |
|---|---|---|---|
| 8,135,930 B1 * | 3/2012 | Mattox | G06F 3/067 711/162 |
| 10,346,191 B2 | 7/2019 | Krishnan et al. | |
| 10,509,667 B1 * | 12/2019 | Popuri | G06F 9/45558 |
| 2006/0050629 A1 * | 3/2006 | Saika | H04L 69/40 370/216 |
| 2012/0233608 A1 * | 9/2012 | Toeroe | G06F 9/45558 718/1 |
| 2014/0074987 A1 * | 3/2014 | Martz | H04L 67/10 709/219 |
| 2015/0154081 A1 * | 6/2015 | Javadekar | G06F 11/1484 707/639 |
| 2015/0277944 A1 * | 10/2015 | Wang | G06F 9/45558 718/1 |

(Continued)

*Primary Examiner* — Aurel Prifti
(74) *Attorney, Agent, or Firm* — Kim & Stewart LLP (57) ABSTRACT

A method of restarting a virtual machine running in a cluster of hosts in a first data center, in a second data center, wherein each virtual machine is assigned a priority level, includes: transmitting virtual machines images running in the cluster at a first time to the second data center; selecting virtual machines to be restarted in the second data center according to priority levels assigned; and for each selected virtual machine, (a) generating difference data in an image of the selected virtual machine at a second time and at the first time, (b) transmitting the difference data to the second data center, (c) setting the virtual machine inactive in the first data center, and (d) communicating with the second data center to set as active; and power on, a virtual machine in the second data center using the image of the virtual machine transmitted to the second data center.

20 Claims, 6 Drawing Sheets

(56) References Cited

U.S. PATENT DOCUMENTS

| | | | |
|---|---|---|---|
| 2015/0378831 A1* | 12/2015 | Tarasuk-Levin | G06F 11/1446 714/15 |
| 2016/0291997 A1* | 10/2016 | Bernal | G06F 9/5077 |
| 2018/0157511 A1* | 6/2018 | Krishnan | G06F 9/5088 |
| 2018/0189087 A1* | 7/2018 | Palermo | H04L 67/142 |
| 2019/0004837 A1* | 1/2019 | Tiwary | H04L 67/10 |
| 2019/0113034 A1* | 4/2019 | Podack | H02K 1/185 |
| 2019/0370043 A1* | 12/2019 | Olderdissen | G06F 3/0673 |
| 2020/0117494 A1* | 4/2020 | Cortez | G06F 9/5088 |
| 2020/0250046 A1* | 8/2020 | Wong | G06F 9/461 |
| 2020/0310849 A1* | 10/2020 | Laurence | G06F 9/45558 |
| 2020/0348873 A1* | 11/2020 | Dawkins | G06F 3/0659 |
| 2021/0117295 A1* | 4/2021 | Sharma | G06F 11/1451 |
| 2021/0124652 A1* | 4/2021 | Srinivasan | G06F 11/1469 |
| 2021/0216350 A1* | 7/2021 | Ito | G06F 9/5038 |
| 2021/0224168 A1* | 7/2021 | Agarwal | G06F 9/45558 |

\* cited by examiner

CLOUD RESTART FOR NON-CRITICAL PERFORMANCE VIRTUAL MACHINES

BACKGROUND

In a virtualization system running within an on-premises network, hosts within the on-premises network have one or more virtual machines (VMs) instantiated therein. For high availability (HA) systems that require maintaining of services with a high degree of availability, hosts run in clusters, across which load balancing and migration of VMs in the event of failure of one of the hosts to another of the hosts in the cluster are provided. In HA systems of today, customers have to reserve one or more hosts in the on-premises network for failover capacity. Many of the reserved hosts for failover capacity, however, remain idle. There have been solutions to share failover capacity among different clusters in the on-premises network but they still require an investment in hosts that may remain idle for long periods of time.

SUMMARY

One or more embodiments provide a method of providing a cloud restart service to enable the restart of VMs that had been running in a host in a cluster of hosts within an on-premises network, in a host running in a cloud computing system, based on priority levels assigned to the VMs.

In one embodiment, a method of restarting a virtual machine running in a cluster of hosts in a first data center, in a second data center, wherein each of the virtual machines running in the cluster of hosts is assigned a priority level, includes: transmitting images of virtual machines running in the cluster of hosts at a first point in time to the second data center; selecting one or more virtual machines to be restarted in the second data center according to priority levels assigned to the virtual machines; and for each of the selected virtual machines, (a) generating difference data representing a difference in an image of the selected virtual machine at a second point in time and the image of the selected virtual machine at the first point in time, (b) transmitting the difference data to the second data center, (c) setting the selected virtual machine to be inactive in the first data center, and (d) communicating with a control plane in the second data center to set as active, and power on, a virtual machine in the second data center using the image of the selected virtual machine transmitted to the second data center after updating the image using the difference data.

Further embodiments include a non-transitory computer-readable storage medium comprising instructions that cause a computer system to carry out the above method above, as well as a computer system configured to carry out the above method.

DETAILED DESCRIPTION

Figure 1:
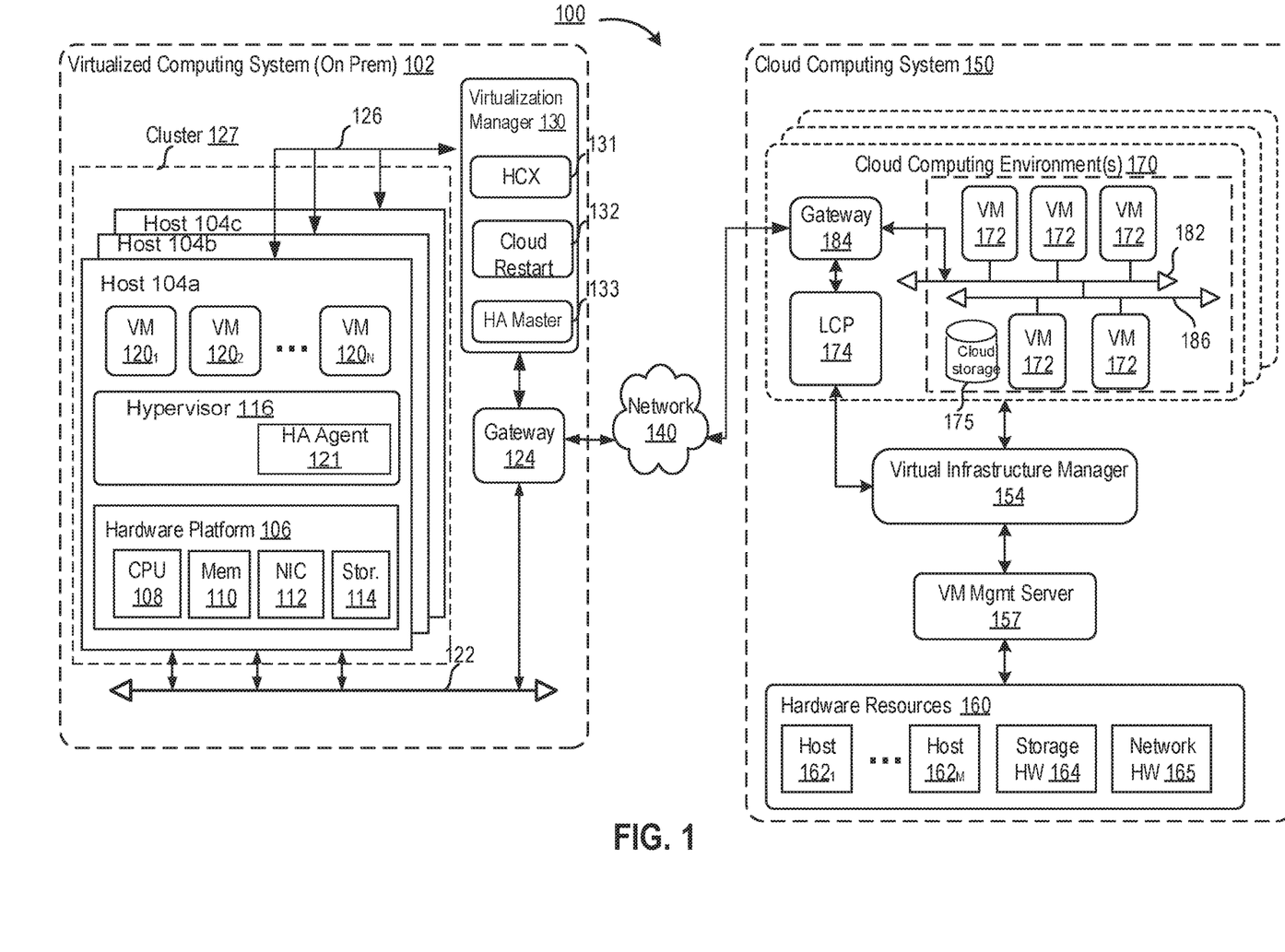
FIG. 1 is a block diagram of a computing system in which one or more embodiments may be utilized.

FIG. 1 is a block diagram of a computing system 100 in which one or more embodiments may be utilized. As shown, computing system 100 includes an on-premises network 102 and a cloud computing system 150. On-premises network 102 includes a virtualized computing system that includes a plurality of hosts 104a, 104b, 104c, with each host having one or more VMs $120_1, 120_2, \ldots, 120_n$ instantiated therein. Hosts 104a, 104b, 104c form a cluster 127 of hosts. In the embodiments illustrated herein, cluster 127 of hosts is configured to provide high availability (HA) services, such that if one of the hosts in cluster 127 experiences a failure, the VMs in the failed host can be restarted in another host in cluster 127 or as further described below in cloud computing system 150.

Each of the hosts 104a, 104b, 104c includes hypervisor 116 and HA agent 121, which run on top of hardware platform 106. Hardware platform 106 includes CPU 106, memory 110, network interface card (NIC) 112, and storage 114.

On-premises network 102 also includes virtualization manager 130, which manages the provisioning of virtual compute, network, and storage resources (e.g., VMs $120_1, 120_2, \ldots, 120_n$) from physical compute, network, and storage resources in on-premise network 102. In the embodiments illustrated herein, virtualization manager 130 also includes hybrid cloud exchange service (HCX) 131, cloud restart service 132, and HA master 133, all of which will be further described below.

Cloud computing system 150 includes the following control plane components, a virtual infrastructure manager 154 and a VM management server 157, through which virtual compute, storage and network resources are provisioned for different customers of cloud computing system. VM management server 157 is a virtualization management software executed in a physical or virtual server (e.g., VMware vCenter Server®), that cooperates with hypervisors installed in hosts $162_1$ to $162_M$ to provision virtual compute, storage and network resources from hardware resources 160, which include hosts $162_1$ to $162_M$, storage hardware 164, and network hardware 165. Virtual infrastructure manager 154 is a virtual infrastructure management software executed in a physical or virtual server (e.g., VMware vCloud Director®), that partitions the virtual compute, storage and network resources provisioned by VM management server 157, for the different customers of cloud computing system 150. As shown in FIG. 1, cloud computing system 150 may support multiple cloud computing environments (one of which is depicted as cloud computing environment 170), that are available to different customers in a multi-tenant configuration.

The virtual compute, storage, and network resources are provisioned in cloud computing environment 170 to form a virtual data center or a software-defined data center. The virtual data center includes one or more virtual networks 182 used to communicate amongst VMs 172 and managed by at least one network gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to an external network 140 (e.g., Internet). Gateway 184 manages external public IP addresses for the virtual data center and one or more private internal networks interconnecting VMs 172. Gateway 184 is configured to route traffic incoming to and outgoing from the virtual data center and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within on-premises network 102. As shown in FIG. 1, the VMs 172 may be instantiated on one or more hosts $162_1, \ldots, 162_n$.

The virtual data center further includes a local control plane (LCP) 174, implemented as a physical or virtual server, configured to communicate with virtual infrastructure manager 154 and enable control-plane communications between an administrator computer and virtual infrastructure manager 154.

Figure 2:
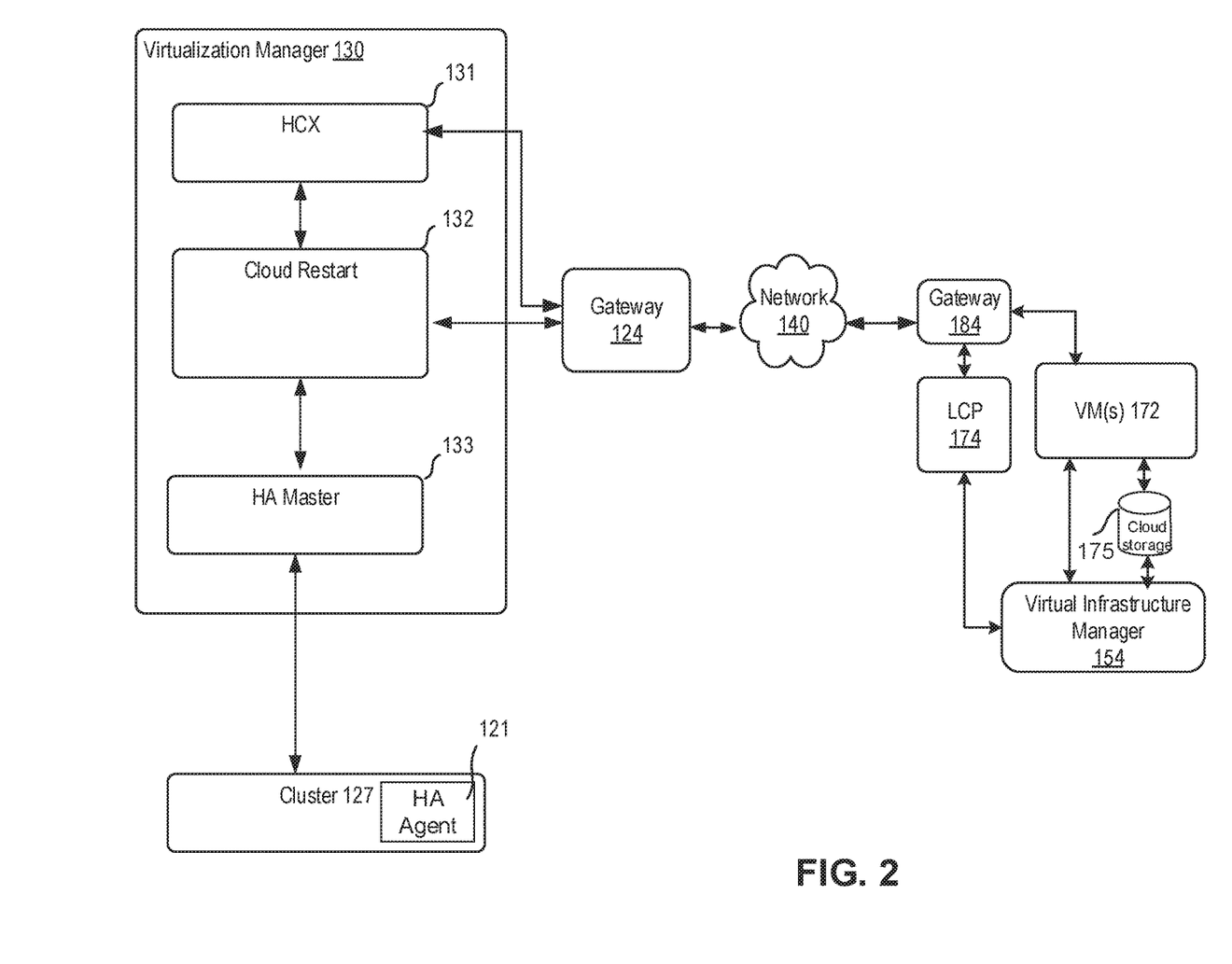
FIG. 2 is a block diagram of a virtualization manager of an on-premises network and elements of a cloud computing system that enable restart of VMs in the cloud, according to one or more embodiments.

FIG. 2 is a block diagram showing elements of computing system 100 used to restart a VM running in on-premises network 102 in cloud computing environment 170, according to one or more embodiments. Each host in cluster 127 includes an HA agent 121, which monitors the health of the host on which it is installed. HA agent 121 provides periodic health reports to HA master 133 of virtualization manager 130, which acts accordingly by informing cloud restart service 132 to start a VM failover-to-cloud process, to be explained in more detail below. HCX service 131 provides a control plane connectivity to cloud computing environment 170, so that VMs of cluster 127 can include both VMs running in on-premises network 102 and VMs running in cloud computing environment 170. Also shown in FIG. 2 is LCP 174, which is the control plane unit of cloud computing environment 170 that communicates with HCX 130 of on-premises network 102, and which instructs virtual infrastructure manager 154 to provision one or more VMs in cloud computing environment 170. Cloud storage 175, which may be an object-based storage, is used to store images of VMs currently running in on-premises network 102, so that when one or those VMs fails, a restart of those VMs in cloud computing environment 170 may be performed as explained in detail below.

Figure 3:
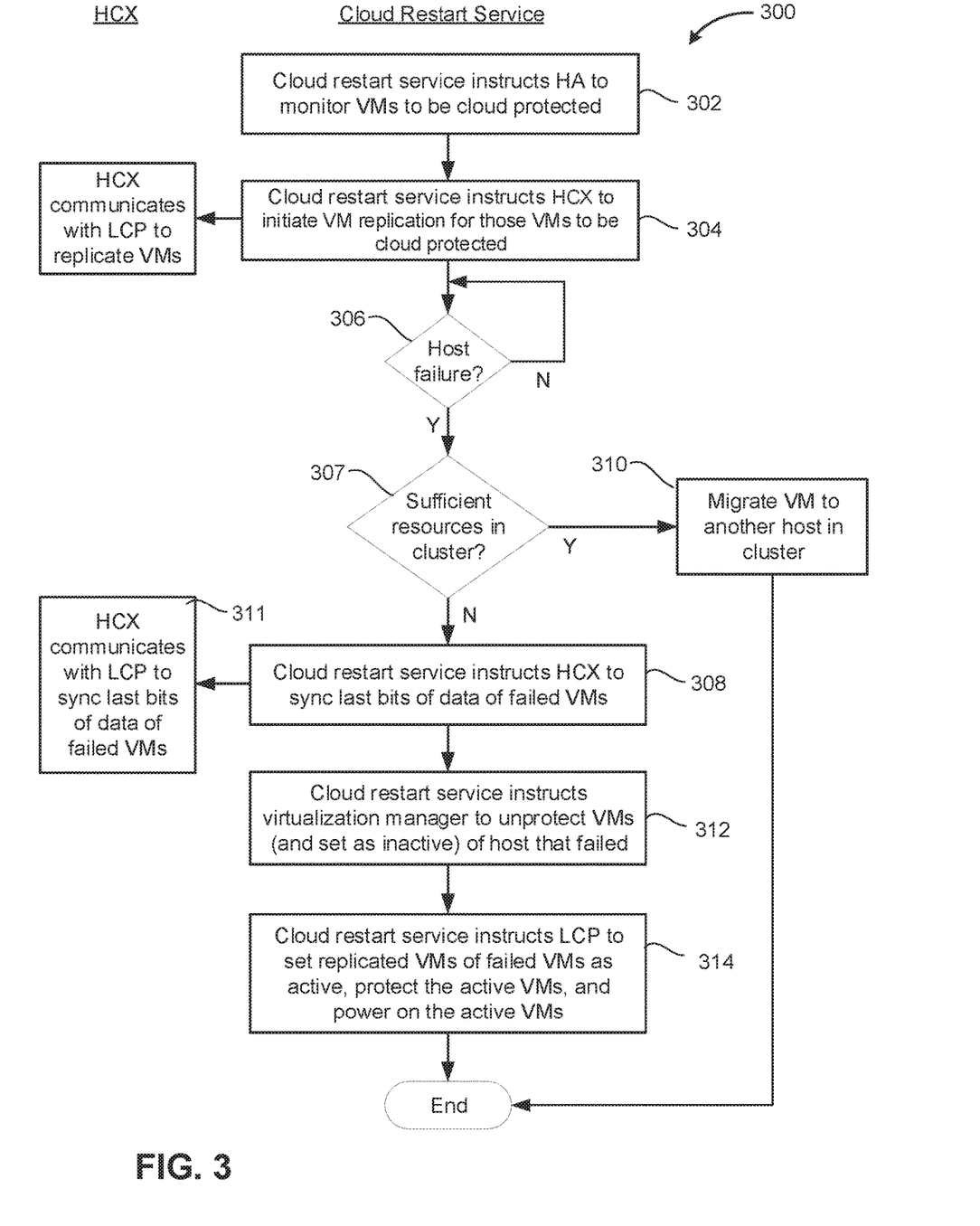
FIG. 3 is a flow diagram showing steps performed by a cloud restart service and by an HCX service to enable restart of VMs in the cloud, according to one or more embodiments.

FIG. 3 is a flow diagram showing steps performed in a method 300 of restarting a VM in cloud computing environment 170, according to one or more embodiments. In step 302 and with reference also to FIG. 1, cloud restart service 132 instructs HA agent 121 of each host 104a, 104b, 104c within cluster 127 to monitor VMs $120_1, 120_2, \ldots, 120_n$ to be cloud protected. In step 304, cloud restart service 132 instructs HCX service 131 to initiate VM replication for those VMs to be cloud protected. In step 306, a determination is made as to whether or not a host 104a, 104b, 104c has failed. This is performed by HA agent 121 running within each of the hosts 104a, 104b, 104c of cluster 127. If none of the hosts is experiencing a failure, then the process loops back to step 306, to continue monitoring for a failure of a host.

If a host has experienced a failure, as reported by a HA agent 121 running in that host (e.g., or by the HA agent not being able to send a heartbeat signal to HA master 133 at a prescribed time, thereby indicating a problem with a host on which that HA agent is installed), in step 307 a determination is made by virtualization manage 130 as to whether there are sufficient available resources within cluster 127 to spin up the VMs that are running in the failed host in another host within cluster 127. If there are sufficient available resources ('Yes' decision in step 307), then in step 310 the VMs of the failed host are migrated to another host in cluster 127 that can accommodate those VMs, and the process ends. If there are not sufficient available resources ('No' decision in step 307), then in step 308 cloud restart service 132 instructs HCX service 131 to synchronize the last bits of data of the failed VMs, i.e., cloud restart service 132 generates difference data representing any updates to the failed VM images since they were replicated in step 304 and transmits the difference data to HCX service 131 for synchronization. In step 311, HCX service 131 communicates with LCP 174 of cloud computing environment 170 to synchronize the last bits of data of the failed VMs by updating the image of the failed VMs stored in cloud storage 175 with the different data transmitted by cloud restart service 132. In step 312, cloud restart service 132 instructs virtualization manager 130 to unprotect the VMs of the host that failed, which also includes setting those VMs as 'inactive'. In step 314, cloud restart service 132 instructs LCP 174 of cloud computing environment 170 to: a) set replicated VMs of failed VMs as active within cloud computing environment 170, b) protect the active VMs, and c) power on the active VMs.

By way of the steps shown in FIG. 3, a customer pays cloud computing environment 170 for services required for running VMs in cloud computing environment 170 only when there is a failure in a host of an HA cluster and only when other hosts in the HA cluster cannot accommodate the VMs of the failed host. While cloud storage resources may be needed for replicating the VM images prior to failure, such costs are generally much lower than reserving extra hosts in on-premises network 102.

Figure 4:
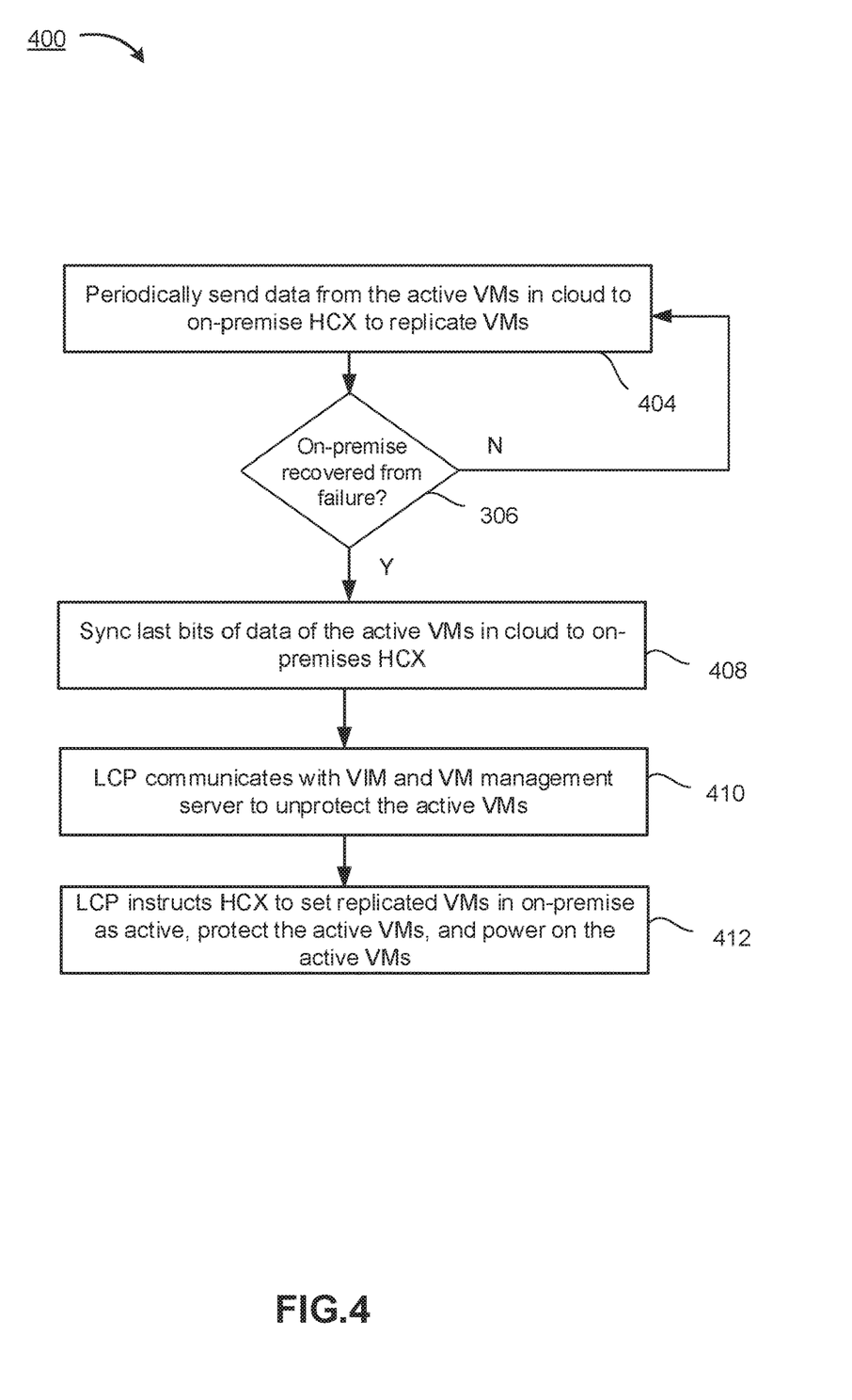
FIG. 4 is a flow diagram showing steps performed by a local control plane of a cloud computing system to enable migration of VMs from the cloud to the on-premises network, according to one or more embodiments.

FIG. 4 is a flow diagram illustrating a method 400 performed by LCP 174 of cloud computing environment 170 to enable migration of a VM that had been restarted in cloud computing environment 170, back to a host of cluster 127 that has recovered from the failure, according to one or more embodiments. In step 404, LCP 174 causes difference data representing updates to the images of the VMs running in cloud computing environment 170, to be periodically sent to on-premises HCX 131, for updating of the images of these VMs stored in on-premises network 102. In step 406, a determination is made as to whether or not a previously failed host in cluster 127 has recovered from failure. If the host has not recovered from the failure ('No' decision in step 406), the process loops back to step 404 to continue to periodically send the difference data to on-premises HCX service 131, for updating of the images of these VMs stored in on-premises network 102. If the host has recovered from the failure ('Yes' decision in step 406), in step 408 the last bits of data obtained from the active VMs running in cloud computing environment 170, i.e., any updates to such VM images since step 404, are sent to on-premises HCX service 131 for synchronization. In step 410, LCP 174 communicates with virtual infrastructure manager 154 and VM management server 157 of cloud computing system 150 to unprotect the active VMs running in cloud computing environment 170. In step 412, LCP 174 instructs HCX service 131 to: a) set replicated VMs in on-premises network 102 as 'active', b) protect the active VMs, and c) power on the active VMs.

Figure 5:
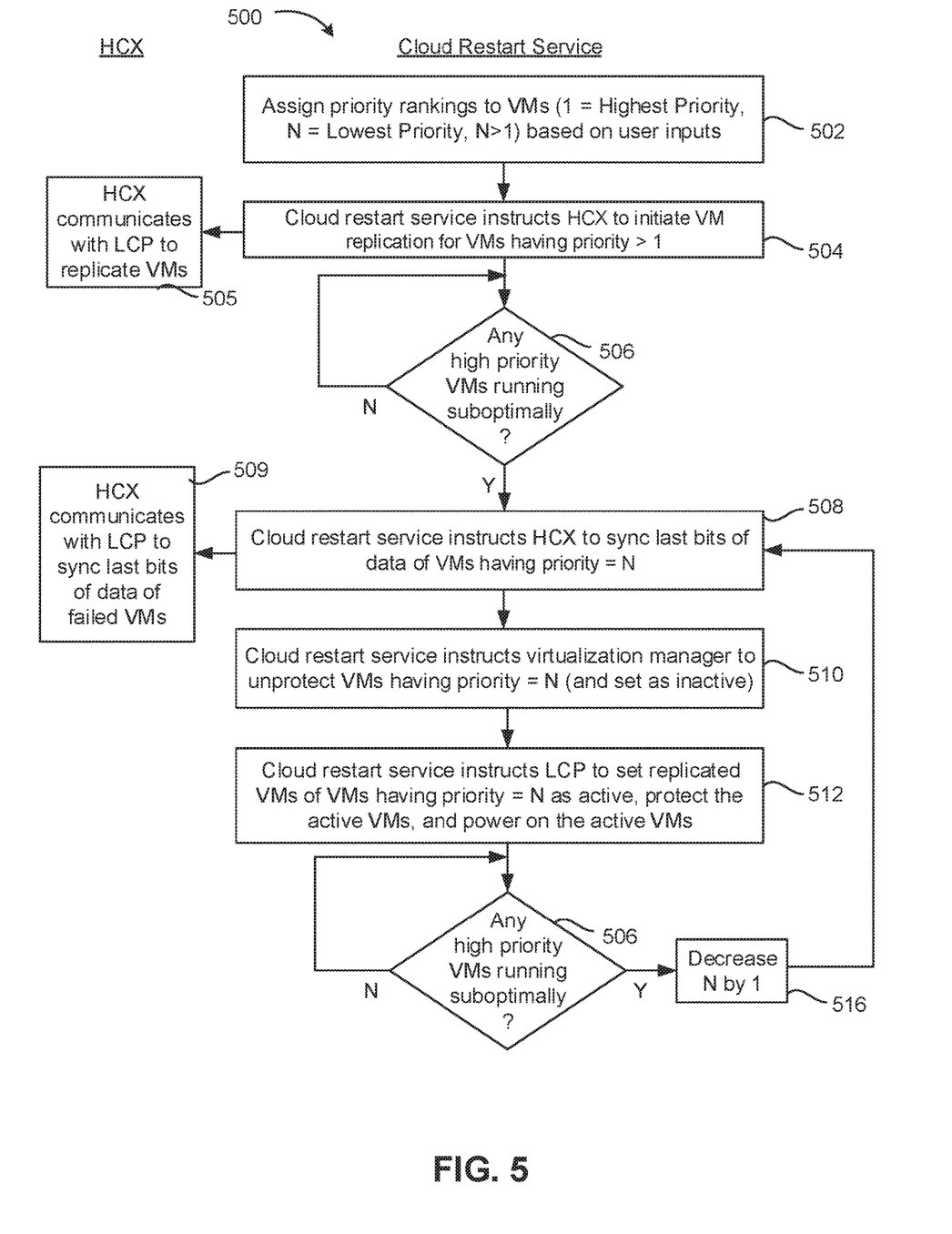
FIG. 5 is a flow diagram showing steps performed by a cloud restart service and by an HCX service to enable restart of lower-priority VMs in the cloud, according to one or more embodiments.

FIG. 5 is a flow diagram illustrating a method 500 of migrating VMs between an on-premises network 102 and a cloud computing environment 170 based on 'priority', according to one or more embodiments. More specifically, if there are a plurality of VMs running in a cluster 127 (see FIG. 1), those VMs may be assigned different priority levels, such that high priority VMs should be provided with the necessary amount of resources to run at an acceptable speed, whereas low priority VMs should have their resources lessened to accommodate the higher priority VMs.

In step 502, each of the VMs $120_1$, $120_2$, ..., $120_n$ running within hosts 104a, 104b, 104c of cluster 127 are assigned priority rankings, such as a ranking from a highest priority of one (1) to a lower priority of N, with N being an integer greater than one. For example, a scale from 1 (highest priority) to 5 (lowest priority) may be utilized to rank the VMs. In step 504, cloud restart service 132 instructs HCX service 131 to initiate VM replication for VMs having the lowest priority ranking (e.g., the VMs ranked with a value of 5), and in step 505 HCX communicates with LCP 174 to replicate VMs. In step 506, a determination is made as to whether any of the high priority VMs (the VMs ranked '1') are running sub-optimally. Such information may be provided by way of HA agent 121 in cluster 127 to HA master 133, for example, and may involve determining the amount of processor resources consumed by the high-priority VMs over a most recent time period (e.g., the last 10 milliseconds). If the determination in step 506 is 'No', then the process loops back to step 506 to continue to monitor the high-ranked VMs to make sure they are running at acceptable conditions. If the determination in step 506 if 'Yes', then in step 508 cloud restart service 132 instructs HCX service 131 to synchronize the last bits of data of VMs having priority=N, with those being the lowest priority VMs, and in step 509 HCX service 131 communicates with LCP 174 to synchronize the last bits of data of the lowest priority VMs. In step 510, cloud restart service 132 instructs virtualization manager 130 to unprotect VMs having priority=N, and set those VMs as 'inactive'. In step 512, cloud restart service 132 instructs LCP 174 of cloud computing service 150 to: a) set replicated VMs of VMs having priority=N as 'active', b) protect the active VMs, and c) power on the active VMs.

In step 514, a determination is made as to whether any of the high priority VMs (e.g., VMs having priority=1) are running sub-optimally. If 'Yes', then N is decreased by one (1), such as from N=5 to N=4, and the process loops back to step 508. If 'No', meaning that all of the high priority VMs are running optimally, then the process loops back to step 506, to continue monitoring the performance of the high priority VMs.

So, with reference again to FIG. 4, if at least one of the high priority VMs is running sub-optimally even after all of the lowest ranked (=5) VMs have been transferred to cloud computing system 170 and are no longer being run within cluster 127, the next-lowest ranked (=4) VMs are synchronized with the cloud computing service 150 for possible migration of those VMs to cloud computing system 170, to enable the high priority VMs to run at their optimal levels. This process may continue until all the high priority VMs are running optimally. For example, it may be the case that all VMs ranked 2, 3, 4 and 5 may have to be transferred to cloud computing environment 170 to enable all VMs ranked 1 within cluster 127 to run at their optimal levels.

Figure 6:
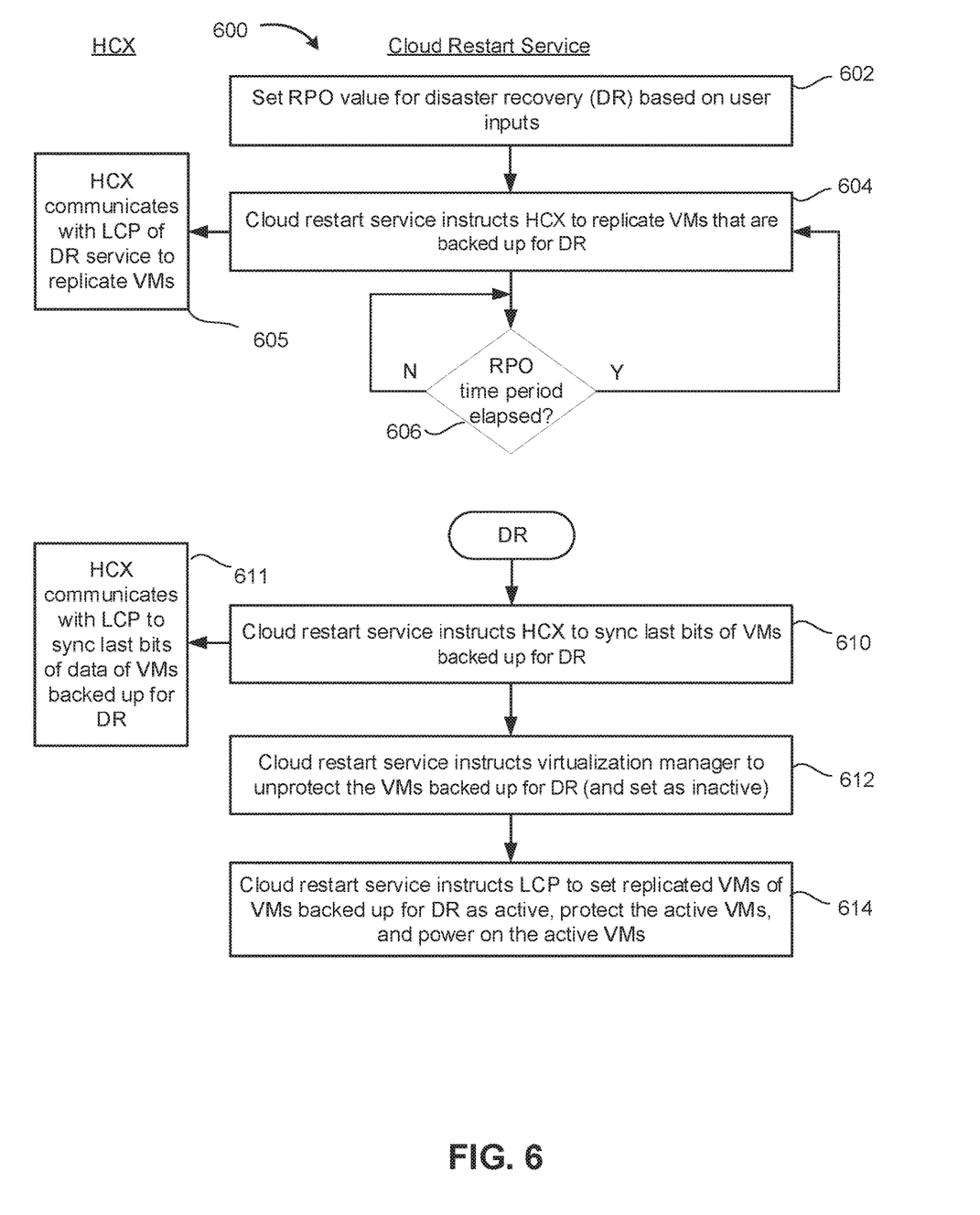
FIG. 6 is a flow diagram showing steps performed by a cloud restart service and by an HCX service to enable disaster recovery of VMs to the cloud, according to one or more embodiments.

FIG. 6 illustrates a method 600 of transferring VMs from on-premises to the cloud in a disaster recovery (DR) operation, according to one or more embodiments. For DR, there is typically set a recovery time objective (RTO) and a recovery point objective (RPO), which have to be met to salvage the on-premises network after a disaster has occurred. This may involve moving the entire on-premises network to a different location, due to a weather catastrophe at a location where the on-premises network is located. Conventionally, to cause DR to occur, a person, such as an administrator, must manually perform an operation, such as by clicking a 'restart all VMs in the cloud' button, due to a disaster happening at the on-premises network. The embodiments described with reference to FIG. 6 do not require a manual operation by an administrator and instead VM transfer from on-premises to the cloud takes place automatically. A detection of a partial DR event triggers VMs to be restarted in cloud computing environment 170 in the manner similar to that described above with respect to FIG. 3. This results in a much quicker RTO, in the order of minutes, than may be obtained from conventional DR processes that typically take multiple hours or more.

In step 602, RPO value is set for DR, such as by an administrator of on-premises network 102. In step 604, cloud restart service 132 instructs HCX service 131 to replicate VMs that are backed up for DR. This may involve just high priority VMs, or it may involve all VMs running in on-premises network 102. In step 605, HCX service 131 communicates with LCP 174 of DR service to replicate VMs. In step 606, a determination is made as to whether or not the RPO time period has elapsed. If 'Yes', then the process loops back to step 604. If 'No', then the process waits until the RPO time period has elapsed.

At any time, if a partial DR event has occurred, steps 610, 611, 612, and 614 are carried out automatically by cloud restart service 132. In step 610, cloud restart service 132 instructs HCX service 131 to synchronize the last bits of data of VMs backed up for DR, in a similar manner as described above. In step 611, HCX service 131 communicates with LCP 174 of cloud computing environment 170 to synchronize the last bits of data of VMs backed up for DR. In step 612, cloud restart service 132 instructs visualization manager 130 to unprotect the VMs backed up for DR, and set those unprotected VMs as 'inactive'. In step 614, cloud restart service 132 instructs LCP 174 of cloud computing environment 170 to: a) set replicated VMs of VMs backed up for DR as 'active', b) protect the active VMs, and c) power on the active VMs.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of restarting a virtual machine running in a cluster of hosts in a first data center, in a second data center, wherein each of the virtual machines running in the cluster of hosts is assigned a priority level, the method comprising:

selecting one or more of the virtual machines running in the cluster of hosts to be restarted in the second data center according to priority levels assigned to the virtual machines, wherein the one or more virtual machines that are selected have a lowest priority level assigned thereto;

transmitting images of the selected virtual machines at a first point in time to the second data center;

monitoring a performance of one or more of the virtual machines having a highest priority level assigned thereto after the first point in time; and upon determining that the monitored performance of the one or more of the virtual machines having the highest priority level assigned thereto is below a minimum performance threshold, restarting each of the selected virtual machines in the second data center by: (a) generating difference data representing a difference in an image of the selected virtual machine at a second point in time and the image of the selected virtual machine at the first point in time, (b) transmitting the difference data to the second data center, (c) setting the selected virtual machine to be inactive in the first data center; and (d) communicating with a control plane in the second data center to set as active, and power on, a virtual machine in the second data center using the image of the selected virtual machine transmitted to the second data center after updating the image using the difference data.

2. The method of claim 1, wherein the first data center is an on-premise data center serving one tenant and the second data center is a cloud data center serving a plurality of tenants.

3. The method of claim 1, wherein the monitored performance is computer processor usage and the minimum performance threshold is defined according to an SLA (service level agreement).

4. The method of claim 1 wherein the one or more virtual machines that are selected have two lowest priority levels assigned thereto.

5. The method of claim 4, wherein upon determining that the monitored performance of the one or more of the virtual machines having the highest priority level assigned thereto is below the minimum performance threshold, the one or more virtual machines that are assigned the lowest priority level are powered on in the second data center; and then upon determining that the monitored performance of the one or more of the virtual machines having the highest priority level assigned thereto is still below the minimum performance threshold, the one or more virtual machines that are assigned the second lowest priority level are powered on in the second data center.

6. The method of claim 1, wherein the one or more virtual machines that have been selected are live migrated to the second data center.

7. The method of claim 1, wherein each of the hosts of the cluster includes an agent that monitors the performance of virtual machines running therein and reports the performance to a master service, and the performance of the one or more of the virtual machines having the highest priority level assigned thereto is determined based on the performance reported by the agents to the master service.

8. The method of claim 7, wherein each agent sends a heartbeat signal to the master service at prescribed times and the master service determines that a host of the cluster has failed based on the heartbeat signal not being received from an agent of the failed host at a prescribed time.

9. A computer system comprising:
a memory configured to store executable code for restarting a virtual machine (VM) running in a cluster of hosts in a first data center; and
a processor configured to execute the code to:
select one or more virtual machines running in the cluster of hosts to be restarted in the second data center according to priority levels assigned to the virtual machines, wherein the one or more virtual machines that are selected have a lowest priority level assigned thereto;
transmit images of the selected virtual machines at a first point in time to the second data center;
monitor a performance of one or more of the virtual machines having a highest priority level assigned thereto after the first point in time; and
upon determining that the monitored performance of the one or more of the virtual machines having the highest priority level assigned thereto is below a minimum performance threshold, restart each of the selected virtual machines in the second data center by: (a) generating difference data representing a difference in an image of the selected virtual machine at a second point in time and the image of the selected virtual machine at the first point in time, (b) transmitting the difference data to the second data center, (c) setting the selected virtual machine to be inactive in the first data center; and (d) communicating with a control plane in the second data center to set as active, and power on, a virtual machine in the second data center using the image of the selected virtual machine transmitted to the second data center after updating the image using the difference data.

10. The computer system of claim 9, wherein the first data center is an on-premise data center serving one tenant and the second data center is a cloud data center serving a plurality of tenants.

11. The computer system of claim 9 wherein the monitored performance is computer processor usage and the minimum performance threshold is defined according to an SLA (service level agreement).

12. The computer system of claim 9, wherein the one or more virtual machines that are selected have two lowest priority levels assigned thereto.

13. The computer system of claim 12, wherein
upon determining that the monitored performance of the one or more of the virtual machines having the highest priority level assigned thereto is below the minimum performance threshold, the one or more virtual machines that are assigned the lowest priority level are powered on in the second data center; and then
upon determining that the monitored performance of the one or more of the virtual machines having the highest priority level assigned thereto is still below the minimum performance threshold, the one or more virtual machines that are assigned the second lowest priority level are powered on in the second data center.

14. The computer system of claim 9, wherein the one or more virtual machines that have been selected are live migrated to the second data center.

15. The computer system of claim 9, wherein each of the hosts of the cluster includes an agent that monitors the performance of virtual machines running therein and reports the performance to a master service, and the performance of the one or more of the virtual machines having the highest priority level assigned thereto is determined based on the performance reported by the agents to the master service.

16. The computer system of claim 15, wherein each agent sends a heartbeat signal to the master service at prescribed times and the master service determines that a host of the cluster has failed based on the heartbeat signal not being received from an agent of the failed host at a prescribed time.

17. A non-transitory computer-readable medium storing code for causing, when executed by a processor, restarting of a virtual machine running in a cluster of hosts in a first data center, to a second data center, the processor when executing the code performing the steps of:
selecting one or more virtual machines running in the cluster of hosts to be restarted in the second data center according to priority levels assigned to the virtual machines, wherein the one or more virtual machines that are selected have a lowest priority level assigned thereto;
transmiting images of the selected virtual machines at a first point in time to the second data center;
monitoring a performance of one or more of the virtual machines having a highest priority level assigned thereto after the first point in time; and
upon determining that the monitored performance of the one or more of the virtual machines having the highest priority level assigned thereto is below a minimum performance threshold, restarting each of the selected virtual machines in the second data center by: (a) generating difference data representing a difference in an image of the selected virtual machine at a second point in time and the image of the selected virtual machine at the first point in time, (b) transmitting the difference data to the second data center, (c) setting the selected virtual machine to be inactive in the first data center; and (d) communicating with a control plane in the second data center to set as active, and power on, a virtual machine in the second data center using the image of the selected virtual machine transmitted to the second data center after updating the image using the difference data.

18. The non-transitory computer-readable medium of claim 17, wherein the first data center is an on-premise data center serving one tenant and the second data center is a cloud data center serving a plurality of tenants.

19. The non-transitory computer-readable medium of claim 17, wherein the monitored performance is computer processor usage and the minimum performance threshold is defined according to an SLA (service level agreement).

20. The non-transitory computer-readable medium of claim 17, wherein each of the hosts of the cluster includes an agent that monitors the performance of virtual machines running therein and reports the performance to a master service, and the performance of the one or more of the virtual machines having the highest priority level assigned thereto is determined based on the performance reported by the agents to the master service.

* * * * *